(12) United States Patent
Mori

(10) Patent No.: US 8,147,311 B2
(45) Date of Patent: Apr. 3, 2012

(54) GAME STATE PRESENTING DEVICE, GAME STATE PRESENTING METHOD, INFORMATION RECORDING MEDIUM, AND PROGRAM

(75) Inventor: Shoji Mori, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 899 days.

(21) Appl. No.: 12/279,626

(22) PCT Filed: Feb. 15, 2007

(86) PCT No.: PCT/JP2007/052735
§ 371 (c)(1),
(2), (4) Date: Aug. 15, 2008

(87) PCT Pub. No.: WO2007/094410
PCT Pub. Date: Aug. 23, 2007

(65) Prior Publication Data
US 2010/0234102 A1 Sep. 16, 2010

(30) Foreign Application Priority Data
Feb. 17, 2006 (JP) ................................. 2006-040305

(51) Int. Cl.
*A63F 13/00* (2006.01)
*A63F 1/18* (2006.01)

(52) U.S. Cl. ................ 463/13; 463/12; 463/16; 463/22; 463/42; 273/292; 273/293; 273/304; 273/306

(58) Field of Classification Search .............. 463/10–13, 463/16–22, 25–29, 40–42; 273/138.1, 139, 273/142 B, 142 A, 142 J, 148 A, 148 R, 148 B, 273/149 P, 149 R, 274, 292–293, 304, 306, 273/309
See application file for complete search history.

(56) References Cited

U.S. PATENT DOCUMENTS
5,397,133 A * 3/1995 Penzias ........................ 463/22
(Continued)

FOREIGN PATENT DOCUMENTS
JP 2001-17736 A 1/2001
(Continued)

OTHER PUBLICATIONS
Enterbrain, Inc., Fantasy Star Online, LOGIN, 2002 Nen 6 Gatsu Go, vol. 21, No. 6, Jun. 1, 2002, pp. 124-125.
(Continued)

*Primary Examiner* — Arthur O. Hall
(74) *Attorney, Agent, or Firm* — Howard & Howard Attorneys PLLC

(57) ABSTRACT

To suppress easy transmission of information on the hand of a player to another player through an audience when the audience can watch the status of a hand of each player of mah-jongg, a card game, or the like, in a game status presenting device (801), an identifier storing unit (802) stores an identifier of a hand of each player, a first correspondence-table acquisition unit (803) acquires a first correspondence table which associates an identifier with presentation information to be presented to a player, a second correspondence-table acquisition unit (804) acquires a second correspondence table which associates an identifier with presentation information to be presented to an audience, a player presentation unit (805) refers to an identifier stored in the identifier storing unit (802) as a hand of each player and the first correspondence table, and presents presentation information on the hand of the player to each player, and an audience presentation unit (806) refers to an identifier stored in the identifier storing unit (802) as hands of all players and the second correspondence table, and presents presentation information of the hands of all players to an audience.

10 Claims, 9 Drawing Sheets

U.S. PATENT DOCUMENTS

| | | | |
|---|---|---|---|
| 5,451,054 A * | 9/1995 | Orenstein | 273/148 R |
| 6,612,931 B2 * | 9/2003 | Kojima et al. | 463/42 |
| 6,921,337 B1 * | 7/2005 | Kennedy et al. | 463/42 |
| 7,727,060 B2 * | 6/2010 | Mills | 463/13 |
| 8,021,230 B2 * | 9/2011 | Baerlocher et al. | 463/25 |
| 2002/0094869 A1 * | 7/2002 | Harkham | 463/42 |
| 2003/0176211 A1 * | 9/2003 | Sommerville | 463/16 |
| 2004/0135316 A1 * | 7/2004 | Lipscomb | 273/274 |
| 2005/0054408 A1 * | 3/2005 | Steil et al. | 463/11 |
| 2005/0164761 A1 * | 7/2005 | Tain | 463/13 |
| 2005/0272501 A1 * | 12/2005 | Tran et al. | 463/29 |
| 2006/0217199 A1 * | 9/2006 | Adcox et al. | 463/40 |
| 2007/0045957 A1 * | 3/2007 | Blair, Jr. | 273/274 |

FOREIGN PATENT DOCUMENTS

| | | |
|---|---|---|
| JP | 2003-071132 | 3/2003 |
| JP | 2004-24368 A | 1/2004 |
| JP | 2004 154598 A | 6/2004 |
| TW | 581698 A | 4/2004 |
| TW | 592759 A | 6/2004 |
| WO | WO 00/16863 A | 3/2000 |
| WO | WO 02/096529 A | 12/2002 |

OTHER PUBLICATIONS

Media Works, Inc., Fantasy Star Online, Dengeki Dreamcast, 2000 Nen 12/22 Go, vol. 5, No. 20, Dec. 22, 2000, pp. 22-23.
International Search Report PCT/JP2007/052735 dated Mar. 6, 2007.
European Search Report EP07714265 dated Jun. 24, 2009, 7 pages.
Taiwanese Office Action Application No. 096106207 dated May 27, 2009, 8 pages.

* cited by examiner

IDENTIFIER STORING UNIT

| | | | | | |
|---|---|---|---|---|---|
| FIRST PLAYER | 4 | 11 | 21 | 23 | 44 |
| SECOND PLAYER | 2 | 8 | 49 | 50 | 52 |
| THIRD PLAYER | 12 | 13 | 38 | 46 | 53 |
| FOURTH PLAYER | 16 | 28 | 29 | 35 | 43 |

YOUR ARE SECOND PLAYER

YOUR ARE THIRD PLAYER

FIG.16

YOUR ARE AUDIENCE

| | | | | | |
|---|---|---|---|---|---|
| FIRST PLAYER | ♣ 5 | ♡ 4 | ♡ J | ♠ 8 | ♠ 10 |
| SECOND PLAYER | ♣ 10 | ♣ J | ♣ K | ♡ 2 | ♡ 8 |
| THIRD PLAYER | ♣ 7 | ♦ Q | ♡ Q | ♡ K | JK |
| FOURTH PLAYER | ♣ 4 | ♦ 2 | ♦ 3 | ♦ 9 | ♠ 3 |

GAME STATE PRESENTING DEVICE, GAME STATE PRESENTING METHOD, INFORMATION RECORDING MEDIUM, AND PROGRAM

TECHNICAL FIELD

The present invention relates to a game status presenting device, a game status presenting method, a computer-readable information recording medium storing a program for realizing those using a computer, and the program which are suitable for suppressing easy transmission of information on the hand of a player to another player through an audience when the status of a hand of each player of mah-jongg, a card game, or the like are watched by the audience.

BACKGROUND ART

There have been proposed games, such as mah-jongg, card game, and a Japanese flower card game in which a player holds tiles and cards as a hand so as not to be known by another player. For example, the following literature discloses a technology related to such games.

Patent Literature 1: Unexamined Japanese Patent Application KOKAI Publication No. 2003-71132

The [patent literature 1] discloses a technology which allows a player to set an appropriate condition when comparing the content of his/her hand with the content of a hand discarded by another player, and determining whether or not the hand discarded by another player is to be called or to be Mahjong (RON).

A communication type mah-jongg game or the like which allows distant players to play such a game using a computer communication network is also in use.

Some of such communication type mah-jongg games provide both play mode in which a user participates as a player and watch mode in which the user watches the match-up of other players. This is the same service as a live report of a match-up and a report of a match-up record through a magazine, a TV program or the like, and is a response to a need of a user who does not want to participate in a game, only to watch the match-up of skilled players.

In a watch mode, all of the card hands or the tile hands of individual players are often viewable in accordance with the live report of a mah-jongg match-up through a magazine or a TV program.

DISCLOSURE OF INVENTION

Problem to be Solved by the Invention

However, if an audience can view all of the card hands or the tile hands of individual players, cheating in which the audience tells a player the status of the card hands or the tile hands of another player may occur, so that a game may become unfair. On the other hand, there is a problem that the pleasure of watching decreases if the audience can watch the hand of merely one player.

Therefore, there is a demand for a technology which allows a user to watch the status of a hand of each player of mah-jongg, a card game or the like, and which suppresses transmission of information on the hand of a player to another player through an audience as much as possible.

The present invention is to overcome the foregoing problem, and it is an object of the invention to provide a game status presenting device, a game status presenting method, a computer-readable information recording medium storing a program for realizing those using a computer, and the program which are suitable for suppressing easy transmission of information on the hand of a player to another player through an audience when the audience can watch the status of a hand of each player of mah-jongg, a card game, or the like.

Means for Solving the Problem

To achieve the object, the following invention will be disclosed based on the principle of the invention.

A game status presenting device according to the first aspect of the invention has an identifier storing unit, a first correspondence-table acquisition unit, a second correspondence-table acquisition unit, a player presentation unit, and an audience presentation unit, and comprises as follows.

First, the identifier storing unit stores an identifier of an operation target held by each of a plurality of players so as not to be acquired by another player in a game where the plurality of players participate and operate a plurality of operation targets.

A tile of mah-jongg, a card of a card game, and a card of a Japanese flower card game correspond to the operation target. A tile hand of mah-jongg, a card hand of the card game, and a card hand of the Japanese flower card game correspond to the operation target held in such a manner as not to be acquired by another player.

An identifier is allocated to a tile, a card, or a flower card used in a game. For example, in the case of mah-jongg, as suited tiles, there are 9×4 tiles for each of MAN-ZU, SOU-ZU, and PIN-ZU, as wild tiles, there are 4×4 tiles as EAST, SOUTH, WEST, and NORTH, as Dragon Tiles, there are 3×4 tiles as HAKU (WHITE), HATSU (GREEN), and CHUN, so that a total of 136 tiles are used, and in the case of a card game, there are 13 cards for each suit, so that there are 53 cards if a joker is used. It is typical that identifiers starting from 1 (or 0) are allocated to the tiles or the cards without any duplication.

On the other hand, the first correspondence-table acquisition unit acquires a first correspondence table associating an identifier of an operation target with presentation information on that operation target presented to a player, for each of the plurality of operation targets.

According to the foregoing example, the first correspondence table manages which number (identifier) from 1 to 136 actually corresponds to a mah-jongg tile (operation target), or which number (identifier) from 1 to 53 actually corresponds to a card (operation target). The first correspondence table is used to present a card hand or a piece hand to a player, and based on the first correspondence table, a pat hand fitting the rules of a game itself is determined or a score is calculated.

Additionally, the second correspondence-table acquisition unit acquires a second correspondence table associating the identifier of an operation target with presentation information on that operation target presented to an audience of the game, for each of the plurality of operation targets.

Likewise the first correspondence table, the second correspondence table decides an association of an identifier with an operation target, but the second correspondence table is used for presenting a card hand or a tile hand to an audience. Therefore, to prevent any cheating, it is typical that the first correspondence table and the second correspondence table differ from each other.

That is, typically, the first correspondence-table acquisition unit and the second correspondence-table acquisition unit acquire each of the first correspondence table and the second correspondence table in such a way that a kind and a number of the kinds of presentation information included in the first correspondence table matches a kind and a number of the kinds of presentation information included in the second correspondence table, and in such a way that the first correspondence table and the second correspondence table differ from each other.

Typically, the presentation information stored in the first correspondence table and the second correspondence table in association with an identifier of each of the plurality of operation targets includes a non-numerical attribute, and the presentation information stored in the first correspondence table and the second correspondence table in association with a part of or all of the plurality of operation targets includes a numerical attribute.

For example, in a case where the game is one using cards, the numerical attribute is any one of A, 2 to 10, J, Q, and K, and the non-numerical attribute is any one of heart, club, spade, diamond, and joker.

In a case where the game is one using mah-jongg tiles, the numerical attribute is any one of 1 to 9, and the non-numerical attribute included in the presentation information including the numerical attribute is any one of MAN-ZU, PIN-ZU, and SOU-ZU, and the non-numerical attribute included in the presentation information not including the numerical attribute is any one of EAST, WEST, SOUTH, NORTH, HAKU (WHITE), HATSU (GREEN), and CHUN.

For each of the identifiers stored in the first correspondence table and the second correspondence table in association with the presentation information including the numerical attribute among the identifiers of the plurality of operation targets, the numerical attributes of tiles of presentation information stored in the first correspondence table and the second correspondence table in association with that identifier are equal.

That is, in the case of a card game, A, 2 to 10, J, Q, and K are constant in the first correspondence table and the second correspondence table, and in the case of mah-jongg tiles, 1 to 9 are constant in the first correspondence table and the second correspondence table.

An identifier stored in association with presentation information having equal non-numerical attributes in the first correspondence table is stored in association with presentation information having equal non-numerical attributes in the second correspondence table.

For example, if an identifier is heart in the first correspondence table, and is spade in the second correspondence table, hearts in the first correspondence table are all spades in the second correspondence table. That is, the first correspondence table and the second correspondence table interchange the suits of cards.

Likewise, in the case of mah-jongg tiles, it is possible to use the first correspondence table and the second correspondence table in which MAN-ZU, PIN-ZU, and SOU-ZU are interchanged with each other.

Furthermore, it is typical in case of mah-jongg to interchange EAST, WEST, SOUTH, and NORTH, and HAKU (WHITE), HATSU (GREEN), and CHUN (RED).

The player presentation unit presents a player with the presentation information, associated in the first correspondence table with an identifier stored in the identifier storing unit as an identifier of an operation target held by the player so as not to be acquired by another player, as a game status of the player, for each of the plurality of players when the game progresses and the identifier storing unit is updated.

That is, image information of a card hand or a tile hand to be displayed on a screen is acquired with reference to an identifier of a card hand or a tile hand of each player and the first correspondence table, and only the card hand or the tile hand of the player is presented to that player.

On the other hand, the audience presentation unit presents the audience with the presentation information, associated in the second correspondence table with an identifier stored in the identifier storing unit, as a game status of the entire game in association with a player who holds an operation target of that identifier so as not to be acquired by another player when the game progresses and the identifier storing unit is updated.

That is, image information on a card hand or a tile hand to be displayed on a screen is acquired with reference to identifiers of card hands or tile hands of all players and the second correspondence table, and the card hands or tile hands of all players are presented to the audience.

According to the invention, the first correspondence table and the second correspondence table having different contents are acquired, thereby preventing the audience from leaking a card hand or a tile hand of a player to another player as much as possible. If it is unknown whether or not the first correspondence table and the second correspondence table have the same content, when the audience leaks cheat information to a player, the credibility of the cheat information can be reduced as much as possible.

Considering the typical example of the foregoing case, in the case of mah-jongg, MAN-ZU, SOU-ZU, and PIN-ZU which are numeric tiles constitute one group, respectively. Moreover, Wind tiles and Dragon Tile also constitute one group, respectively. Therefore, regarding the numeric tiles, a number remains the same as it is, but MAN-ZU, SOU-ZU, or PIN-ZU are associated with the number in a different manner for the player and the audience, and then a hand is presented. Regarding Wind tiles, EAST, WEST, SOUTH, and NORTH are interchanged, and regarding Dragon Tile, HAKU (WHITE), HATSU (GREEN), and CHUN (RED) are interchanged and presented.

In the case of a card game, a number remains the same as it is, but the suits (marks) of hearts, clubs, spades, and diamonds are changed for the player and the audience, and then a hand is presented.

In this case, original card hands or tile hands of all players are not presented to the audience, but appropriately changed hands are presented, so that it is possible to suppress any leakage of information of a card hand or a tile hand. On the other hand, by performing interchanging for each group, and preparing an appropriate correspondence relationship, it is possible to maintain the pleasure with which the audience enjoys the progress of the game.

The game status presenting device can be structured as follows.

That is, the first correspondence-table acquisition unit acquires a first correspondence table assigned to a player from a plurality of correspondence tables prepared beforehand not redundantly for each of the plurality of players, and the player presentation unit presents a player with presentation information of an identifier, associated in the first correspondence table assigned to that player, as a game status of that player for each of the plurality of players.

According to the foregoing invention, a card hand or a tile hand is displayed while the plurality of players use the common first correspondence table, but in the present invention, a card hand or a tile hand is displayed while first correspondence tables differing for each of the plurality of players are used. In the case of mah-jongg, there is a pat hand called RYU-I-SO only for SOU-ZU, among PIN-ZU, SOU-ZU, and MAN-ZU, it may be a problem if first correspondence tables different for each player are used, there is a game adopting a rule having no such a difference.

Therefore, according to the invention, by showing a different card hand or a different tile hand using the first correspondence tables different for each player, it is possible to reduce a possibility that some players partner up to do cheating as much as possible.

In the game status presenting device of the invention, the second correspondence-table acquisition unit may randomly acquire a second correspondence table from a plurality of correspondence tables prepared beforehand.

Correspondence tables used in a game differ from one another, but can inform an audience of the progress status of the game to some extent, and are randomly selected as the first correspondence table and the second correspondence table.

According to the invention, a correspondence table for a player or a correspondence table for an audience is selected from appropriate correspondence tables prepared beforehand, thereby facilitating a process.

In the game status presenting device of the invention, the player presentation unit and the audience presentation unit can be structured in such a manner as to first sort the presentation information by a non-numerical attribute, and to sort the presentation information by a numerical attribute next, and then to present the presentation information.

In a card game or mah-jongg, it is typical that a tile hand or a card hand of each player is arranged in a predetermined order (it is called "RI-PAI" in mah-jongg), and the present invention copes with this. Here, the order of sorting may be in common for all players and all audiences, may be different from one another, or may be partially different.

The order of sorting the non-numerical attributes may be randomly decided when the first correspondence table and the second correspondence table are acquired.

According to the invention, "RI-PAI (arranging one's hands)" or the like is carried out, and a card hand or a tile hand is shown to a player or an audience, thereby facilitating figuring out the state of the card hand or the tile hand, and the presentation position of a corresponding card hand or tile hand may change, so that it becomes possible to prevent cheating as much as possible.

A game status presenting method according to another aspect of the invention is executed by a game status presenting device that has an identifier storing unit, a first correspondence-table acquisition unit, a second correspondence-table acquisition unit, a player presentation unit, and an audience presentation unit, and includes a first correspondence-table acquisition step, a second correspondence-table acquisition step, a player presentation step, and an audience presentation step, and is structured as follows.

The identifier storing unit stores an identifier of an operation target held by each of a plurality of players so as not to be acquired by another player in a game where the plurality of players participate and operate a plurality of operation targets.

On the other hand, in the first correspondence-table acquisition step, the first correspondence-table acquisition unit acquires a first correspondence table associating an identifier of an operation target with presentation information on that operation target presented to a player, for each of the plurality of operation targets.

Further, in the second correspondence-table acquisition step, the second correspondence-table acquisition unit acquires a second correspondence table associating an identifier of the operation target with presentation information on that operation target presented to an audience of the game, for each of the plurality of operation targets.

In the player presentation step, the player presentation unit presents a player with the presentation information, associated in the first correspondence table with an identifier stored in the identifier storing unit as an identifier of an operation target held by the player so as not to be acquired by another player, as a game status of the player, for each of the plurality of players when the game progresses and the identifier storing unit is updated.

Moreover, in the audience presentation step, the audience presentation unit presents the audience with the presentation information, associated in the second correspondence table with an identifier of an operation target stored in the identifier storing unit, as a game status of the entire game in association with a player who holds an operation target of that identifier so as not to be acquired by another player when the game progresses and the identifier storing unit is updated.

A program according to another aspect of the invention allows a computer to function as the foregoing game status presenting device, and allows the computer to execute the foregoing game status presenting method.

The program of the invention can be recorded in a computer-readable information recording medium, such as a compact disk, a flexible disk, a hard disk, a magneto-optical disk, a digital video disk, a magnetic tape, or a semiconductor memory.

The foregoing program may be distributed and sold independently from a computer which executes the program via a computer communication network. Moreover, the information recording medium can be distributed and sold independently from the computer.

Effect of the Invention

According to the invention, it is possible to provide a game status presenting device, a game status presenting method, a computer-readable information recording medium storing a program for realizing those using a computer, and the program which are suitable for suppressing easy transmission of information on the hand of a player to another player through an audience when the audience can watch the status of a hand of each player of mah-jongg, a card game, or the like.

BRIEF DESCRIPTION OF DRAWINGS

FIG. 16 is an explanatory diagram showing presentation information presented to an audience.

DESCRIPTION OF REFERENCE NUMERALS

Figure 1:
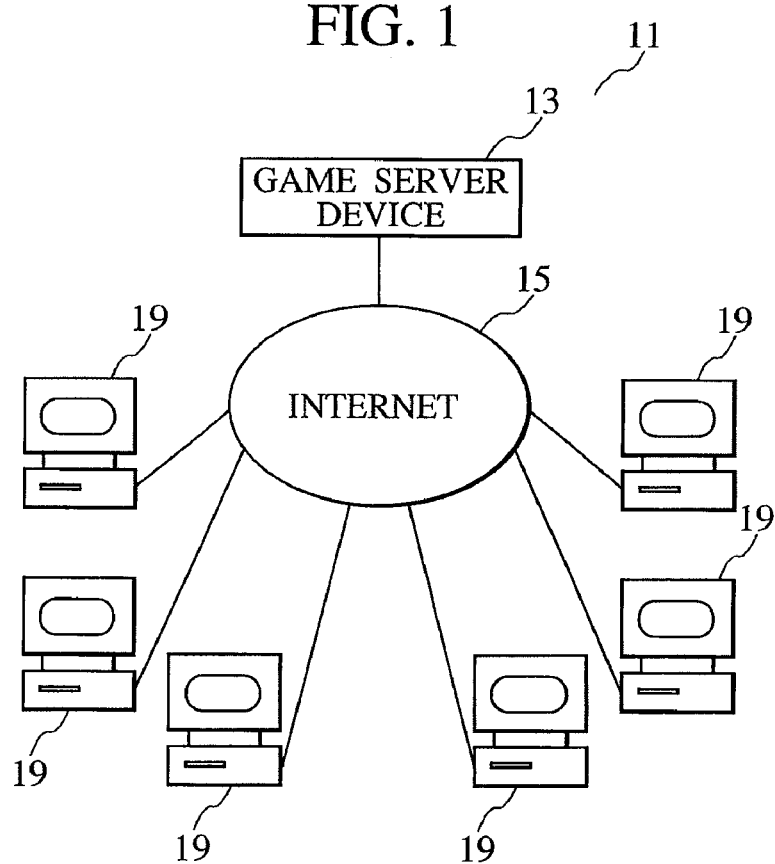
FIG. 1 is a schematic diagram showing the general structure of a game system according to an embodiment of the invention.

13 Game server device
15 Internet
19 Terminal device
101 Information processing device
102 CPU
103 Hard disk
104 RAM
105 NIC
106 ROM
107 Input device
108 Display device
801 Game status presenting device
802 Identifier storing unit
803 First correspondence-table acquisition unit
804 Second correspondence-table acquisition unit
805 Player presentation unit
806 Audience presentation unit

BEST MODE FOR CARRYING OUT THE INVENTION

Embodiments of the present invention will be described below. While the following describes embodiments in which the present invention is implemented using a game information processing device for the ease of understanding, the embodiments to be described below are given by way of illustration only, and do not limit the scope of the invention. Therefore, those skilled in the art can employ embodiments in which the individual elements or all the elements are replaced with equivalent ones, and which are also encompassed in the scope of the invention.

To facilitate understanding, an explanation will be mainly given of an example case where a poker card match-up telegame is played, but the invention can be likewise adopted to a case where a match-up telegame of a type that a card hand or a tile hand is not revealed to another player, such as mah-jongg, and such an embodiment is played. These embodiments should also be encompassed in the scope of the invention.

First Embodiment

FIG. 1 is a schematic diagram showing the general structure of a game system according to the embodiment. Hereinafter, an explanation will be given with reference to this figure.

As shown in the figure, a game server device 13 of a game system 11 is connected to a plurality of terminal devices 19 via the Internet 15 in a communicationable manner. The game server device 13 of this embodiment communicates with terminal devices 19 used by individual players participating a match-up telegame, and a terminal device 19 used by an audience provided with a live showing how those players play.

A general-purpose computer or a consumer game device executes a program recorded in a predetermined information recording medium, such as a DVD-ROM (Digital Versatile Disk Read Only Memory) or a hard disk, thereby functioning as the terminal device 19. Image information recording pictures of cards are prepared beforehand in the DVD-ROM or the hard disk, and the game server device 13 provides an instruction to the effect that one of those is selectively displayed to the terminal device 19 via the Internet 15.

A part or all of various kinds of multimedia information, such as sound information, motion picture information, and character information, including the image information may be provided from the game server device. However, in a case where a game is preinstalled, it is typical that such multimedia information is recorded in a DVD-ROM beforehand, the game server device 13 provides command information, indicating which content is to be read out from the DVD-ROM and provided to a player (e.g., information specifying a name of a file in which such information is included, or the like), to the terminal device 19, and the terminal device 19 reads out the content from the DVD-ROM in accordance with the command information, and provides the read-out content to a player.

Figure 2:
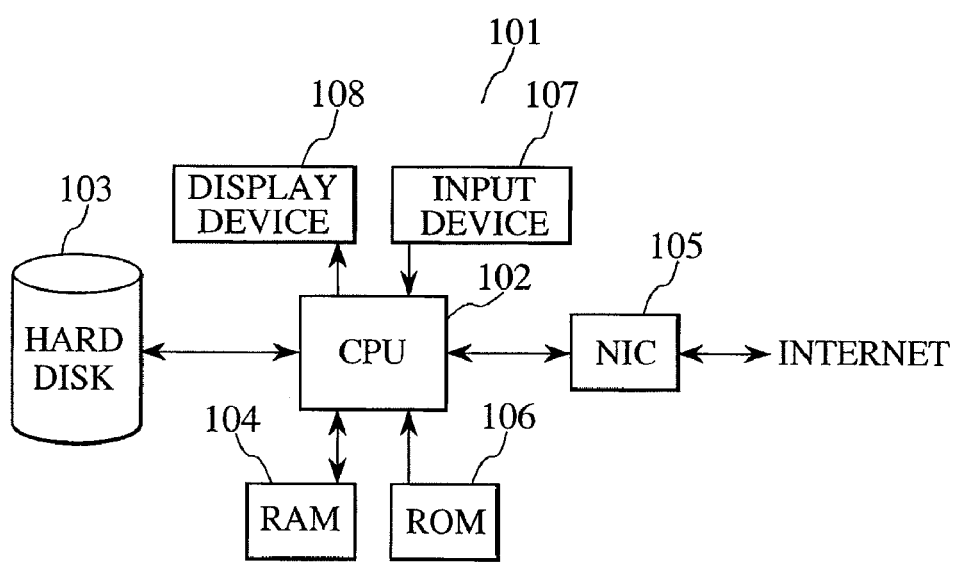
FIG. 2 is a schematic diagram showing the general structure of a typical information processing device that realizes a game server device of the embodiment by executing a program.

FIG. 2 is a schematic diagram showing the general structure of a typical information processing device realizing the game server device or the terminal device of this embodiment by executing a program. Hereinafter, an explanation will be given with reference to this figure.

An information processing device 101 operates under the control of a CPU 102. The CPU 102 reads out a game service program recorded in a hard disk 103 to a RAM 104 used as a temporal memory area, and executes the program, thereby causing the information processing device 101 to function as the game server device 13 or the terminal device 19.

The information processing device 101 has a network interface card (Network Interface Card; NIC) 105 connected to the Internet 15, and communicates with the plurality of terminal devices 19 or another game server device 13 through the NIC 105.

In addition, the information processing device 101 has a ROM 106 where an IPL (Initial Program Loader) which is a program executed when power is turned on is stored. The information processing device 101 may have an input device 107, such as a keyboard or a mouse, and a display device 108, such as a CRT (Cathode Ray Tube) or a liquid crystal display, but regarding input/output with a user managing the game server devices, another information processing device connected through the NIC 105 can be used as a terminal.

The hard disk 103 records image information, sound information, motion picture information, character information and the like of a content to be provided to a player, and a program which receives a selection from the player, processes the selection in accordance with the rules of a game, progresses the game, determines winning or losing, and calculates a score.

Regarding a technology which realizes the match-up telegaming of a card game or a mah-jongg game, a well-known conventional technology can be directly used.

According to the invention, fifty-three playing cards allocated with identification numbers, respectively, and a correspondence relationship between an identification number and image information (and character information) of a card provided to a player is set. A correspondence table for setting such a correspondence relationship is called a "first correspondence table".

Figure 3:
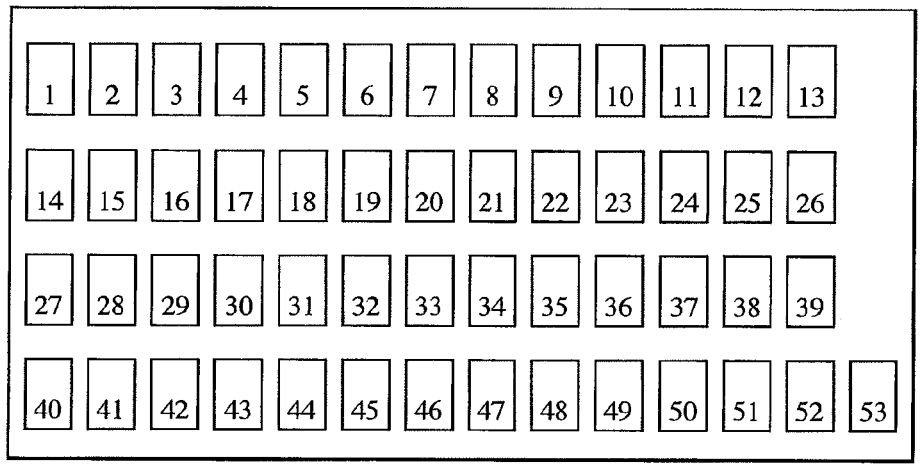
FIG. 3 is an explanatory diagram showing identification numbers allocated to cards.
Figure 4:
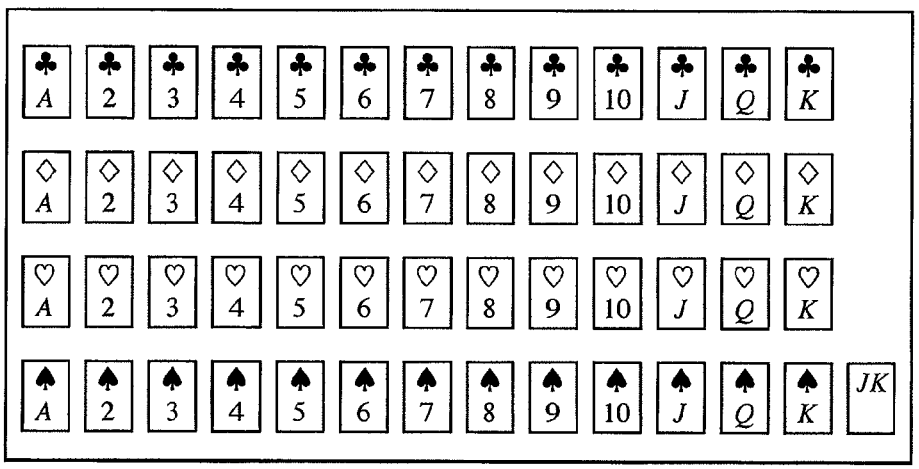
FIG. 4 is an explanatory diagram showing a correspondence relationship between an identification number and a card presented to a player.

FIG. 3 is an explanatory diagram showing identification numbers allocated to the fifty-three playing cards, and FIG. 4 is an explanatory diagram showing a correspondence relationship between an identification number and a card provided to a player. Hereinafter, an explanation will be given with reference to these figures.

In FIG. 3, identification numbers from 1 to 53 are allocated to the fifty-three cards, respectively, so that individual cards can be distinguished.

On the other hand, thirteen clubs, thirteen diamonds, thirteen hearts, thirteen spades, and a joker are laid out, and the identification numbers of individual cards can be figured out by overlapping such a layout on FIG. 3. For example, the ace of club has an identification number 1, and the joker has an identification number 53.

Considering the attribution of a playing card, normal cards other than the joker have a numeral attribute of a number (ace (1), 2 to 10, jack (11), queen (12), or king (13)), and a non-numeral attribute of a suit (club, heart, diamond, or spade).

The same is true of mah-jongg, and there are numeral attributes from 1 to 9 in the suited tiles, and non-numeral attributes of MAN, PIN, and SOU. However, a Dragon Tile has only non-numeral attributes of HAKU (WHITE), HATSU (GREEN), and CHUN, and a Wind Tiles has only non-numeral attributes of EAST, SOUTH, WEST, and NORTH.

According to the rules of a game, regarding the numeral attribute, a pat hand is often defined in consideration of the consecutiveness of a numeric value upon consistency of the non-numeral attribute. For example, in a poker game, straight corresponds to such a pat hand, and in mah-jongg, JYUN-TSU corresponds to this pat hand.

On the other hand, regarding a pat hand in a case where the numeral attribute is in common, but the non-numerical attribute differs, it is not important in many cases which non-numerical attribute the pat hand has. For example, in a poker game, pair corresponds to this case. In mah-jongg, a hand becomes KOTSU when all tiles having the same numerical attribute but having different non-numerical attributes are collected.

Therefore, considering the rules of the game, the game comes into effect even if suits of playing cards are interchanged, MAN, SOU, and PIN of mah-jongg are interchanged, Dragon Tiles are interchanged, and Wind tiles are interchanged.

Therefore, according to the invention, interchanging of non-numerical attributes which allows the game to remain consistent is carried out, and then card hands or tile hands of all players are shown to an audience, thereby creating a situation that "a true card hand or a true tile hand" is not directly revealed even if an audience lets a player know the hand of another player.

Figure 5:
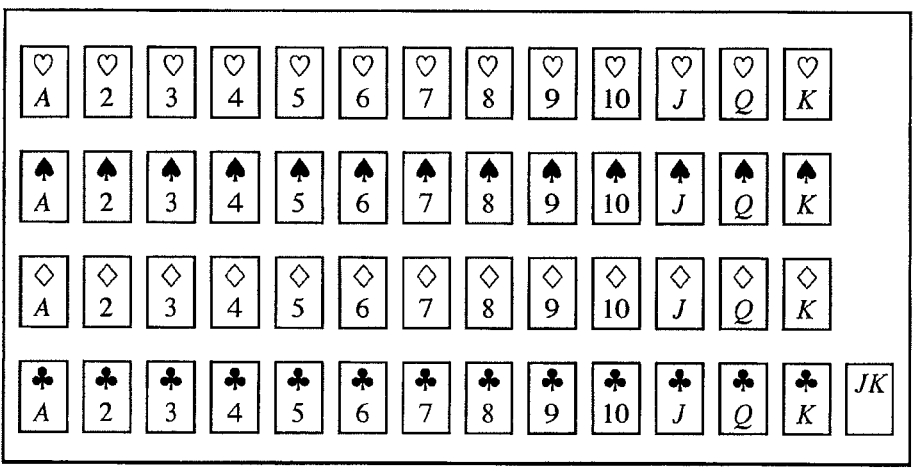
FIG. 5 is an explanatory diagram showing a correspondence relationship between an identification number and a card presented to an audience.
Figure 6:
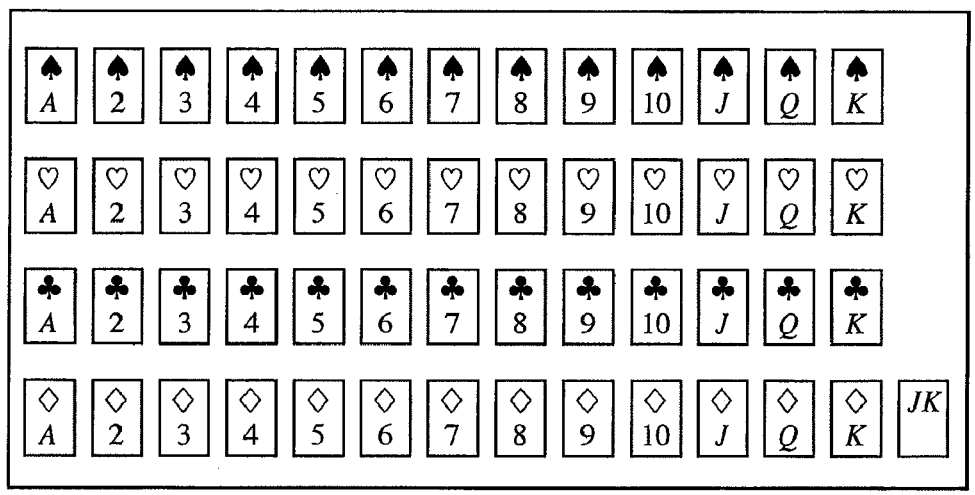
FIG. 6 is an explanatory diagram showing a correspondence relationship between an identification number and a card presented to an audience.
Figure 7:
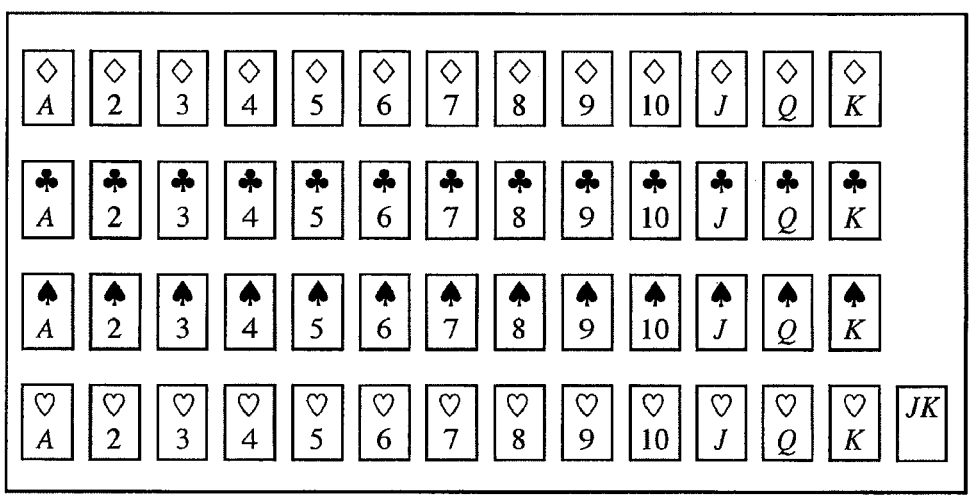
FIG. 7 is an explanatory diagram showing a correspondence relationship between an identification number and a card presented to an audience.

FIGS. 5, 6 and 7 are explanatory diagrams showing a correspondence relationship between the identification number after interchanging has been taken into account and a card shown to the audience.

In the correspondence relationships shown in FIGS. 4 to 7, the suits of playing cards are interchanged, but the numerical attributes are not changed. Even if such an interchanging is carried out, the audience who watches a hand, which is not a true hand that a player actually watches, can figure out the progress status of the game to some extent, and can enjoy watching the match-up status. On the other hand, if the audience lets a player know the hand of another player, it is not directly true card information, thereby preventing an "irresponsible cheating".

In a case of a card game, there are four kinds of suits, so that 4!=24 kinds of such correspondence tables can be created. In a case of mah-jongg, 3!=6 kinds of correspondence tables for numeric tiles, 4!=24 kinds of correspondence tables for Wind tiles, and 3!=6 kinds of correspondence tables for Dragon Tiles can be created, so that a total of 864 kinds of tables can be created.

The conditions of such a correspondence relationship can be sorted out as follows:

(a) regarding cards and tiles to which the same identification number is allocated, presence/absence of a numerical attribute, and presence/absence of a non-numerical attribute are in common;

(b) when cards and tiles to which the same identification number is allocated have numerical attributes, the numerical attributes are in common;

(c) when cards and tiles to which the same identification number is allocated have non-numerical attributes, the non-numerical attributes may be in common or may not be in common; and (d) considering all cards or tiles belonging to a correspondence relationship, the number of cards or tiles having a numerical attribute/non-numerical attribute does not change.

This invention utilizes a correspondence relationship satisfying such conditions.

Figure 8:
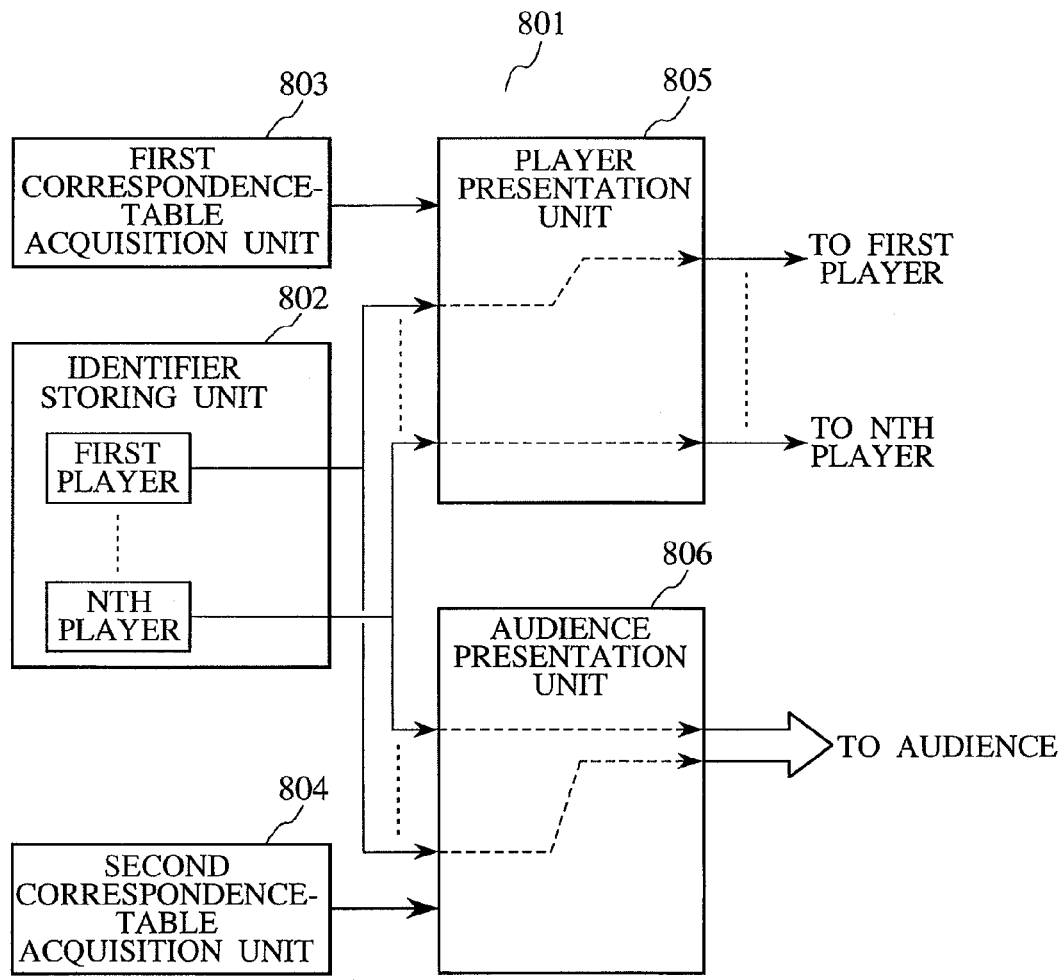
FIG. 8 is a schematic diagram showing the general structure of a game status presenting device of the embodiment.

FIG. 8 is a schematic diagram showing the general structure of a game status presenting device according to this embodiment. Hereinafter, an explanation will be given with reference to this figure.

A game status presenting device 801 has an identifier storing unit 802, a first correspondence-table acquisition unit 803, a second correspondence-table acquisition unit 804, a player presentation unit 805, and an audience presentation unit 806. The functions of the identifier storing unit 802, first correspondence-table acquisition unit 803 and second correspondence-table acquisition unit 804 are mainly realized by the game server device 13, but regarding the functions of the player presentation unit 805 and audience presentation unit 806, the terminal device 19 to which a correspondence table is given from the game server device 13 operates in accordance with an identifier (identification number) provided from the game server device 13, and the game server device 13 and the terminal device 19 cooperate with each other, thereby realizing the functions of the player presentation unit 805 and audience presentation unit 806.

The identifier storing unit 802 comprises the RAM 104 or the like of the game server device 13, and stores the identifier of the hand of each player. The identifier is simply an identification number shown in FIG. 3, and which identification number corresponds to which card is decided by employing a correspondence table shown in FIG. 4.

For example, the identification numbers of the hand of a player, 10, 21, 33, 43, and 51, are read as "club 10, diamond 8, heart 7, spade 4 and spade Q" on the correspondence table shown in FIG. 4.

Figure 9:
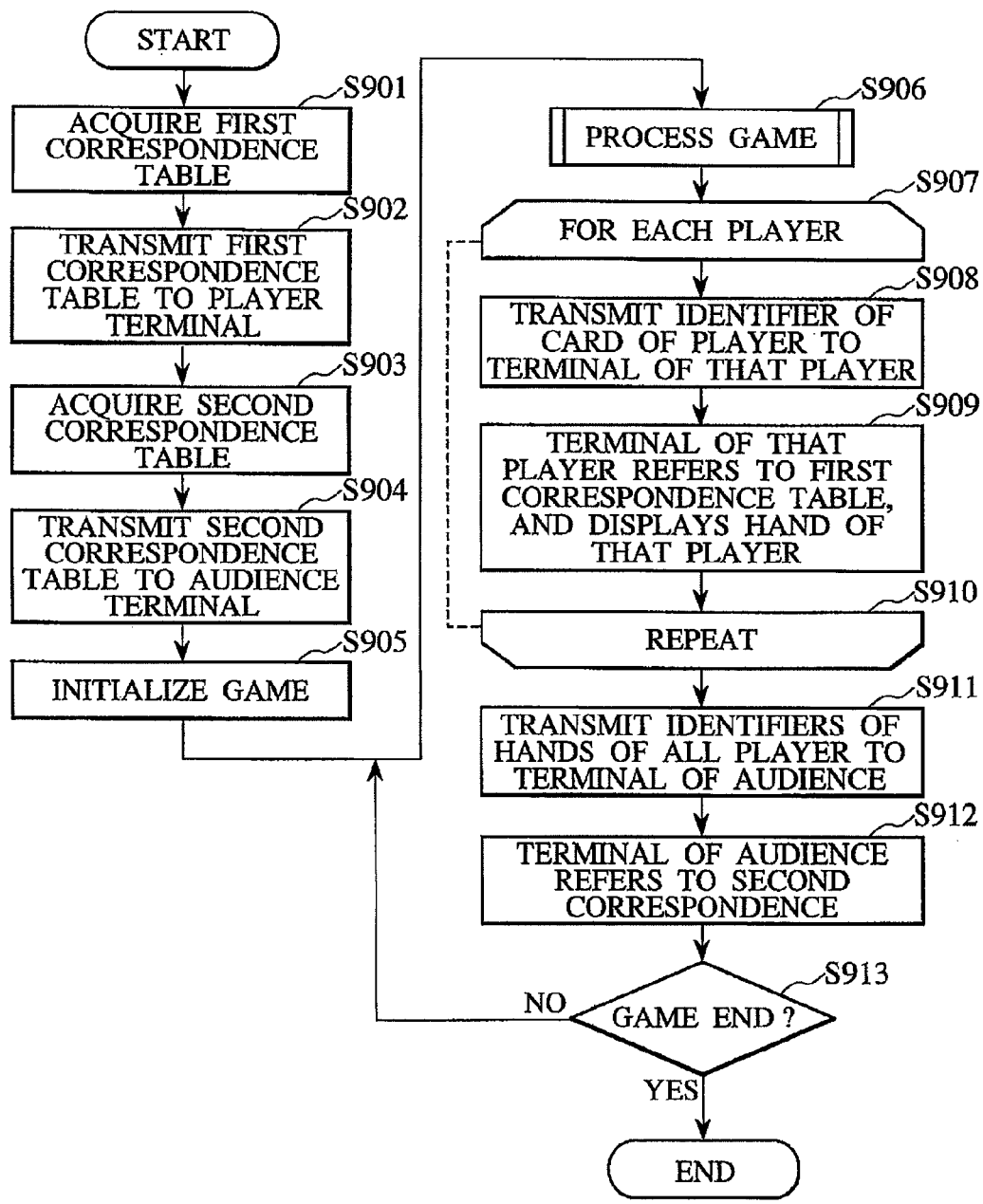
FIG. 9 is an explanatory diagram showing the flow of a control by a game status presenting method.

FIG. 9 is an explanatory diagram showing the flow of a control of a game status presenting method executed by the game status presenting device 801. Hereinafter, an explanation will be given with reference to this figure.

First, the game server device 13 functions as the first correspondence-table acquisition unit 803, and randomly selects one of correspondence tables shown in FIGS. 4 to 7 and prepared beforehand as a first correspondence table for a player (step S901).

Next, the game server device 13 transmits the first correspondence table acquired in the step S901 to the terminal device 19 of the player (step S902). Accordingly, the terminal device 19 of the player stores the received correspondence table, and in this embodiment, the common correspondence table is prepared for the terminal devices 19 of all players.

In the case of mah-jongg, there is a pat hand called RYU-I-SO, so there are relative merits among MAN-ZU, PIN-ZU, and SOU-ZU. Accordingly, it is desirable that the first correspondence table should be in common to all players.

On the other hand, in the case of a card game, there is often no relative merit among the suits. Therefore, it is also possible to prepare first correspondence tables which differ (may differ) for each player are prepared, and display a card hand or a tile hand is shown using those tables. In this manner, it is possible to select any one of fashions appropriately in accordance with the rules of the game.

Next, the game server device 13 functions as the second correspondence-table acquisition unit 804, and randomly selects any one corresponding table that is different from the first corresponding table, from the correspondence tables shown in FIGS. 4 to 7 and prepared beforehand as a second correspondence table for audiences (step S903).

The second correspondence table for the audiences may be in common for all audiences, or may differ for each audience.

Further, the game server device 13 transmits the second correspondence table acquired in the step S903 to the terminal device 19 of an audience, and the terminal device 19 of the audience receives and stores that table (step S904). As explained above, the correspondence table for audiences may be in common for all audiences, or may differ for each audience. In a case where correspondence tables are provided to all audiences randomly, the same table as the first correspondence table may be provided.

The game server device 13 initializes other games (step S905), and starts a game. As the game starts, the game server device 13 and the terminal devices 19 of the respective players work together, and progress the process of the communication type match-up game (step S906). For example, the game server device 13 executes a process of dealing cards to individual players, and processes of notifying a player of the move thereof, inquiring whether or not the player wants to change a card, and changing the card of the player in response to a reply. Those processes are executed in accordance with the rules of the game, and a well-known conventional technology for a communication type match-up game can be adopted thereto.

Meanwhile, changing the card of a player through a dealing or a swapping means that information on an identification number stored in the identifier storing unit 802 is changed.

Figures 10, 11:
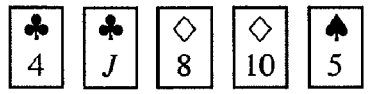
FIG. 10 is an explanatory diagram showing information stored in an identifier storing unit.
FIG. 11 is an explanatory diagram showing presentation information presented to a first player.
Figure 12:
FIG. 12 is an explanatory diagram showing presentation information presented to a second player.
Figure 13:
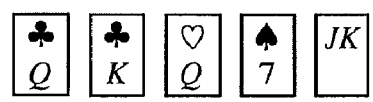
FIG. 13 is an explanatory diagram showing presentation information presented to a third player.
Figure 14:
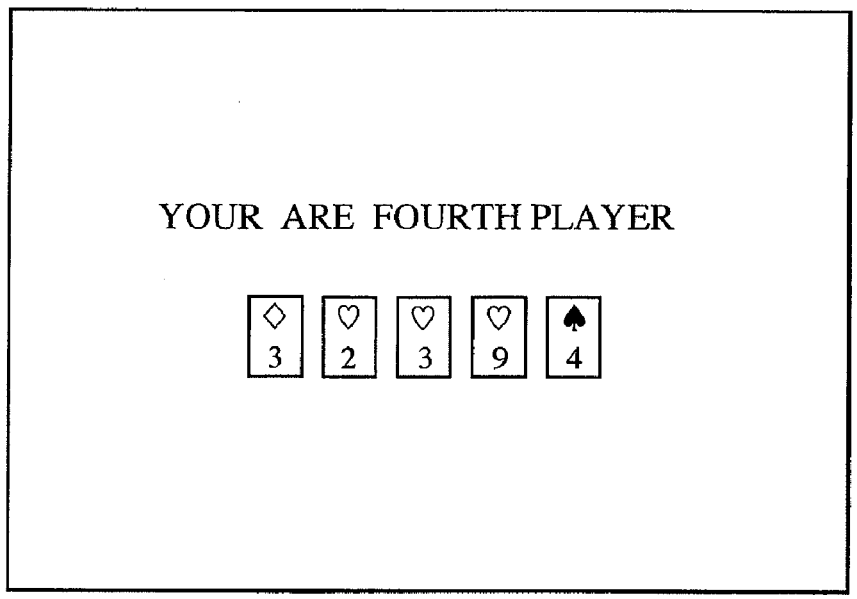
FIG. 14 is an explanatory diagram showing presentation information presented to a fourth player.

FIG. 10 is an explanatory diagram showing information stored in the identifier storing unit 802 in a situation. Hereinafter, an explanation will be given with reference to this figure.

In this game, there are four players from 1 to 4, each having five cards. Each card hand is distinguished by storing an identification number. The game server device 13 learns what card each player really has, from information stored in the identifier storing unit 802 and information of the first correspondence table, and executes a process based on the rules of the game.

As the identifier storing unit 802 is updated, the game server device 13 repeats the process up to the step S910 for each player (step S907).

First, the game server device 13 transmits merely an identification number of the card hand of a player to the terminal device 19 of that player (step S908).

The terminal device 19 of that player acquires a kind of a card to be displayed from the first correspondence table transmitted beforehand and the transmitted identification number of the card hand, and displays the card of that player on the screen of the terminal device 19 (step S909).

This process is repeated for all players (step S910). FIG. 11, FIG. 12, FIG. 13 and FIG. 14 are explanatory diagrams showing presentation information presented to each player in a case where the first correspondence table shown in FIG. 4 is used under a situation shown in FIG. 10. Hereinafter, an explanation will be given with reference to those figures.

As shown in those figures, only information on the card hand of a player is presented to that player. Note that in addition to such information, information on a card spread out for play or on a discard may be added. An identification number shown in FIG. 10 is checked with the first correspondence table shown in FIG. 4, and the image of a card to be presented is acquired.

As explained above, the game server device 13 works together with the terminal device 19, and functions as the player presentation unit 805.

In the process, it is also necessary to display information which must be exhibited to all players, such as spread-out cards or discarded tiles, the identifier of the discard or discarded tile is transmitted from the game server device 13 to the terminal device 19, and the terminal device 19 refers to the first correspondence table that the terminal device 19 itself has, and displays an image corresponding to the identifier of the discard or the discarded tile.

Further, the game server device 13 transmits the identification numbers of the card hands of all players to the terminal device 19 of the audience (step S911).

The terminal device 19 of each audience acquires a kind of a card to be displayed from the second correspondence table transmitted beforehand and the transmitted identification number of a card hand, and displays the cards (not true cards held by players, but cards interchanged in such a manner as not to degrade the amusingness of the game watching) of all players on the screen of the terminal device (step S912).

At this time, it is necessary to display information which must be displayed to all players, such as spread-out cards, or discarded tiles, but identifiers of the discards or the discarded tiles are transmitted to the terminal device 19 from the game server device 13, and the terminal device 19 refers to the second correspondence table that the terminal device 19 itself has, and displays an image corresponding to the identifier of a discard or a discarded tile.

Figure 15:
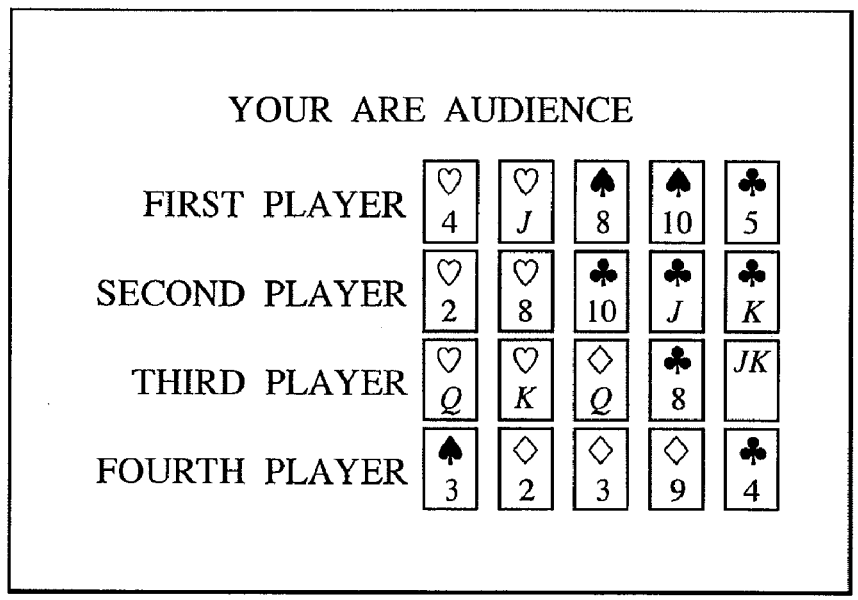
FIG. 15 is an explanatory diagram showing presentation information presented to an audience.

FIG. 15 is an explanatory diagram showing presentation information presented to an audience in a case where the second correspondence table shown in FIG. 5 is used under the situation in FIG. 10. Hereinafter, an explanation will be given with reference to this figure.

As shown in the figure, information on the card hands of all players is presented to the audience, but in comparison with information presented to each player, information on a number matches, but information on a suit is interchanged. Because the rules of the game are constituted symmetrically with respect to the non-numerical attribute, it is viewed by the audience that the rules of the game are appropriately applied even though such a presentation is made to the audience, the audience can enjoy watching the game, and it is possible to prevent irresponsible cheating.

As explained above, the game server device 13 works together with the terminal device 19, and functions as the audience presentation unit 806.

The game server device 13 determines whether or not the game has ended (step S913), and terminates the process if the game has ended (step S913: YES), or returns the process to the step S906 if not ended (step S913: NO).

As explained above, according to this embodiment, it is possible to suppress easy transmission of information on a hand of a player to another player through an audience when the audience can watch the state of the hand of each player of mah-jongg, a card game, or the like.

Second Embodiment

In the foregoing embodiment, cards are arranged in the order of club, diamond, heart, and spade in accordance with the first correspondence table shown in FIG. 4, and presented to a player, and the cards are arranged in accordance with the order of heart, spade, diamond, and club in accordance with the second correspondence table shown in FIG. 5, and presented to an audience, but once it is decided which card is displayed, the display order of a card can be set in accordance with the order of predetermined suits.

FIG. 16 is an explanatory diagram showing a case where an order that cards are arranged by suits and presented to an audience is the same as that of a player.

As shown in the figure, the order when the tiles of mah-jongg or the cards of a card game are arranged may be in common to a player and an audience, may differ from the order in the second correspondence table, or may be set randomly to some extent for the terminal of each player or each audience.

For example, in the case of arrangement in mah-jongg, it is necessary to arrange tiles from a small number to a large number for each kind of MAN-ZU, SOU-ZU, and PIN-ZU, but there is little importance in the order of groups. The same is true of the order of EAST, WEST, SOUTH and NORTH, and the order of HAKU (WHITE), HATSU (GREEN), and CHUN (RED). Therefore, the order of those groups can be decided randomly.

In the case of a card game too, it is not so important how to set the order of heart, spade, diamond, and club in arranging cards, so that the order of those can be set randomly. Note that it is desirable to arrange cards in the order of A, 2 to 10, J, Q, and K in the same group.

That is, in sorting, first, sorting is carried out for non-numerical attributes, and then sorting is carried out in the order of numerical attributes for cards having the same non-numerical attribute.

The order of sorting the non-numerical attributes can be randomly decided by the player presentation unit 805 at the time of starting a game, i.e., in accordance with a timing at which the first correspondence table or the second correspondence table are acquired. This order may be set constant while a card hand or a tile hand is effective (e.g., during "Round" of mah-jongg), but once the game has ended, the order may be decided again randomly.

Because of such a display ingenuity, when a player attempts to cheat, it takes time to figure out the correspondence of cards themselves, so that it is possible to prevent irresponsible cheating as much as possible.

The present application claims the benefit of priority based on Japanese Patent Application No. 2006-040305, and the contents of which are incorporated by references if the laws and ordinances of designated countries permit.

INDUSTRIAL APPLICABILITY

As explained above, according to the invention, it is possible to provide a game status presenting device, a game status presenting method, a computer-readable information recording medium storing a program for realizing those using a computer, and the program which are suitable for suppressing easy transmission of information on the hand of a player to another player through an audience when the audience can watch the status of a hand of each player of mah-jongg, a card game, or the like.

The invention claimed is:

1. A game status presenting device comprising:
an identifier storing unit that stores information related to a plurality of operation targets, each operation target having an associated unique identifier, the information stored in the identifier storing unit including the unique identifier of at least one operation target held by each of a plurality of players so as not to be acquired by another player in a game in which the plurality of players participate and operate a plurality of operation targets;
a first correspondence-table acquisition unit that acquires a first correspondence table, the first correspondence table associating the unique identifier of each of the plurality of operation targets with respective player presentation information to be presented to a respective player;
a second correspondence-table acquisition unit that acquires a second correspondence table, the second correspondence table associating the unique identifier of each of the plurality of operation targets with respective audience presentation information to be presented to an audience of the game, the audience presentation information associated with each unique identifier being different than the player presentation information associated with the same unique identifier;
a player presentation unit that presents each player the respective player presentation information associated in the first correspondence table with the unique identifier of each operation target held by the associated player stored in the identifier storing unit so as not to be acquired by another player, as a game status of the player, for each of the plurality of players when the game progresses and the identifier storing unit is updated; and
an audience presentation unit that presents the audience the audience presentation information associated in the second correspondence table with the unique identifier of an operation target stored in the identifier storing unit and being held by all of the players, as a game status of the entire game in association with each player when the game progresses and the identifier storing unit is updated.

2. The game status presenting device according to claim 1, wherein
presentation information stored in the first correspondence table and the second correspondence table in association with the unique identifier of each of the plurality of operation targets includes a non-numerical attribute,
presentation information stored in the first correspondence table and the second correspondence table in association with the unique identifier of one or all of the plurality of operation targets includes a numerical attribute,
a kind and a number of the kinds of the presentation information stored in the first correspondence table match a kind and a number of the kinds of the presentation information stored in the second correspondence table,
the first correspondence table and the second correspondence table differ from each other,
the numerical attributes of tiles of presentation information stored in the first correspondence table and the second correspondence table in association with one of the unique identifiers are equal for each unique identifier stored in the first correspondence table and the second correspondence table in association with presentation information including the numerical attribute in the unique identifiers of the plurality of operation targets, and unique identifiers stored in the first correspondence table in association with the presentation information having an equal non-numerical attribute are stored in the second correspondence table in association with the presentation information having an equal non-numerical attribute.

3. The game status presenting device according to claim 2, wherein the first correspondence-table acquisition unit acquires a first correspondence table assigned to a player from a plurality of correspondence tables prepared beforehand not redundantly for each of the plurality of players, and the player presentation unit presents a player presentation information of one of the unique identifiers, associated in the first correspondence table assigned to that player, as a game status of that player for each of the plurality of players.

4. The game status presenting device according to claim 2, wherein the second correspondence-table acquisition unit randomly acquires a second 5 correspondence table from a plurality of correspondence tables prepared beforehand.

5. The game status presenting device according to claim 2, wherein the game is a card game, the numerical attribute is any one of A, 2 to 10, J, Q, and K, and the non-numerical attribute is any one of heart, club, spade, diamond, and joker.

6. The game status presenting device according to claim 2, wherein the game uses mah-jongg tiles, the numerical attribute is any one of 1 to 9, the non-numerical attribute included in presentation information including the numerical attribute is any one of MAN-ZU, SOU-ZU, and PIN-ZU, the non-numerical attribute included in presentation information not including the numerical attribute is any one of EAST, WEST, SOUTH, NORTH, HAKU (WHITE), HATSU (GREEN), and CHUN (RED), the non-numerical attribute stored in the second correspondence table in association with one of the unique identifiers having the non-numerical attribute stored in the first correspondence table in association with any one of EAST, WEST, SOUTH, and NORTH is any one of EAST, WEST, SOUTH, and NORTH, and the non-numerical attribute stored in the second correspondence table in association with one of the unique identifiers having the non-numerical attribute stored in the first correspondence table in association with any one of HAKU (WHITE), HATSU (GREEN), and CHUN (RED) is any one of HAKU (WHITE), HATSU (GREEN), and CHUN (RED).

7. The game status presenting device according to claim 2, wherein the player presentation unit and the audience presentation unit first sort the presentation information by a non-numerical attribute, and sort the presentation information by a numerical attribute next, and then present the presentation information.

8. The game status presenting device according to claim 7, wherein an order of sorting non-numerical attributes used by the player presentation unit and the audience presentation unit is randomly decided when the first 10 correspondence table and the second correspondence table are acquired.

9. A game status presenting method, the method comprising the steps of:

storing an identifier of an operation target in an identifier storing unit, the identification storing unit stores information related to a plurality of operation targets, each operation target having an associated unique identifier, the information stored in the identifier storing unit including the unique identifier of a least one operation target held by each of a plurality of players so as not to be acquired by another player in a game in which the plurality of players participate and operate a plurality of operation targets;

a first correspondence-table acquisition step of acquiring a first correspondence table, the first correspondence table associating the unique identifier of each of the plurality of operation targets with respective player presentation information to be presented to a respective player;

a second correspondence-table acquisition step of acquiring a second correspondence table, the second correspondence table associating the unique identifier of each of the plurality of operation targets with respective audience presentation information to be presented to an audience of the game, the audience presentation information associated with each unique identifier being different than the player presentation information associated with the same unique identifier;

a player presentation step of presenting each player the respective player presentation information associated in the first correspondence table with the unique identifier of each operation target held by the associated player stored in the unique identifier storing unit so as not to be acquired by another player, as a game status of the player, for each of the plurality of players when the game progresses and the identifier storing unit is updated; and an audience presentation step of presenting the audience the audience presentation information associated in the second correspondence table with the unique identifier of an operation target stored in the identifier storing unit and being held by all of the players, as a game status of the entire game in association with each player when the game progresses and the identifier storing unit is updated.

10. A non-transitory computer-readable information recording medium storing a program that allows a computer to function as:

an identifier storing unit that stores information related to a plurality of operation targets, each operation target having an associated unique identifier, the information stored in the identifier storing unit including the unique identifier of at least one operation target held by each of a plurality of players so as not to be acquired by another player in a game in which the plurality of players participate and operate a plurality of operation targets;

a first correspondence-table acquisition unit that acquires a first correspondence table, the first correspondence table associating the unique identifier of each of the plurality of operation targets with respective player presentation information to be presented to a respective player;

a second correspondence-table acquisition unit that acquires a second correspondence table, the second correspondence table associating the unique identifier of each of the plurality of operation targets with respective audience presentation information to be presented to an audience of the game, the audience presentation information associated with each unique identifier being different than the player presentation information associated with the same unique identifier;

a player presentation unit (805) that presents each player the respective player presentation information associated in the first correspondence table with the unique identifier of each operation target held by the associated player stored in the identifier storing unit so as not to be acquired by another player, as a game status of the player, for each of the plurality of players when the game progresses and the identifier storing unit is updated; and an audience presentation unit that presents the audience the audience presentation information associated in the second correspondence table with the unique identifier of an operation target stored in the identifier storing unit and being held by all of the players, as a game status of the entire game in association with each player when the game progresses and the identifier storing unit is updated.

* * * * *